July 13, 1937.   F. H. SHEPARD, JR   2,086,964
CURRENT MEASURING MEANS
Filed May 5, 1936

INVENTOR
FRANCIS H. SHEPARD, JR.
BY
Charles McClair
ATTORNEY

Patented July 13, 1937

2,086,964

UNITED STATES PATENT OFFICE 2,086,964

CURRENT MEASURING MEANS

Francis H. Shepard, Jr., Rutherford, N. J., assignor, by mesne assignments, to Radio Corporation of America, New York, N. Y., a corporation of Delaware Application May 5, 1936, Serial No. 78,053

6 Claims. (Cl. 250—41.5)

This invention relates to current measuring means particularly applied to light responsive devices, such as photometers capable of accurately measuring currents representative of values of light and indicating small percentage changes of light at any desired level of illumination.

Photometers are known in which a phototube having an anode and light-responsive or photocathode sealed in an envelope measures light by the current which flows through the phototube in response to light falling upon the light-responsive cathode. In practice it is necessary to have a load impedance in the output circuit of the phototube, and usually the phototube current is measured by a relay connected in series or across the load impedance, the value of the load impedance usually being fixed at some high value so that changes of light upon the photocathode will cause relatively large voltage changes across the impedance. Such a photometer, if constructed to measure a wide range of light values, is not sensitive enough to indicate accurately small changes of light, and if made sensitive to small light changes it is useful over only a relatively narrow range of light intensities.

It is an object of my invention to provide a current measuring device with means for measuring with a single indicating instrument any desired range of current in a circuit.

It is a further object of my invention to provide a photometer the sensitivity and range of which may be varied at will.

It is a further object of my invention to provide a photometer which will accurately indicate small percentages of light change at any level of illumination.

It is a still further object of my invention to provide a photometer which is simple in construction, economical to manufacture, and easy to adjust.

My invention is specifically defined in the appended claims and one embodiment is disclosed in the following specification and the accompanying drawing in which—

Figure 1:
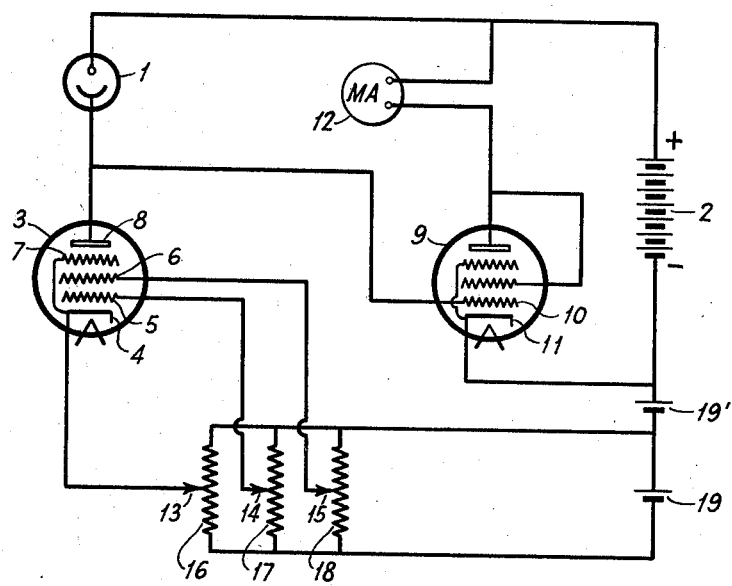
Figure 2:
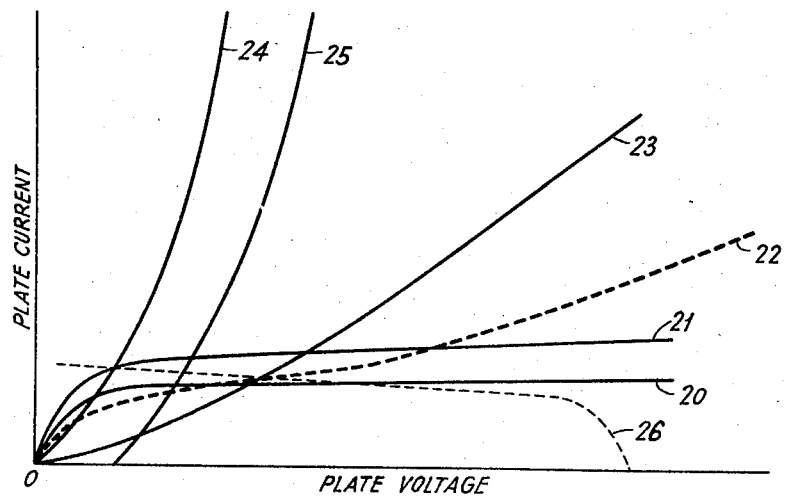

Figure 1 is a circuit diagram of a photometer embodying the characteristic features of my invention, and Figure 2 is a set of curves explanatory of the operation of my improved photometer.

In Figure 1, illustrating one embodiment of my invention, a variable current device is shown which may be a light responsive device such as phototube 1 with its anode connected to the positive terminal of a current source 2 in series through the current source with thermionic discharge tube or device 3, which is preferably of the pentode type, with cathode 4, control grid 5, screen grid 6, suppressor grid 7 and anode 8, and which acts as a thermionic load impedance for the phototube. Variations of light upon the phototube will cause corresponding variations in the flow of current in the anode-cathode path of the thermionic discharge device, and corresponding variations in the voltage drop across the device.

Variations in voltage drop across the thermionic loading impedance may accurately be measured by a vacuum tube voltmeter such as the voltage amplifier 9 with its grid 10 and cathode 11 connected respectively to the anode and to the cathode of the thermionic loading device 3, and the output circuit of the amplifier connected through a current meter 12, shown by way of example as a milliammeter. Since the current in the output circuit of the amplifier 9 responds to the voltage drop across the load impedance of tube 3, the needle deflection of the meter indicates the level of illumination upon phototube 1, and the swing of the meter needle indicates the amount or percentage change of light.

It may be found desirable to obtain an accurate indication of a small percentage change of light at any level of illumination. It may, for example, be desired to obtain full scale deflection of the indicating meter needle with one percent change in light at a level of illumination of, say, 2 lumens, and then obtain full scale deflection with one percent change in light at a level of illumination of 200 lumens. Or, it may be desired to indicate by full scale deflection a 100 percent change in illumination from zero or any finite value to any desired maximum. These extremes in sensitivity, as well as any intermediate degree of sensitivity, may be readily obtained in my improved photometer and according to the characteristic features of my invention by choosing or shifting the plate voltage-plate current characteristics of my loading device 3. Any plate voltage-current response of the tube, usually known as the plate characteristics and obtained graphically by plotting plate voltage against plate current with fixed grid potential, may be selected in the circuits of Figure 1 by adjustment of the absolute and relative potentials of control grid 5 and screen grid 6 so as to obtain at will the characteristics of a high impedance pentode, or a low impedance triode.

While various methods are known for applying biasing potentials to the electrodes of a discharge device, it has been found convenient in applicant's photometer to connect the cathode 4, control grid 5, and screen grid 6, respectively, of the thermionic loading impedance 3 to the sliding contacts 13, 14, and 15 of potentiometers 16, 17, and 18. The potentiometers are each connected across battery 19, which at one end is connected through a biasing battery 19' to the cathode 11 of amplifier 9. By adjusting the position of contact 13 upon potentiometer 16, the normal or reference potential of cathode 4 may be established, and accordingly the normal bias upon the amplifier grid 10 may be fixed. By adjustment of contacts 14 and 15 the relative potentials between grids 5 and 6 and their potential with respect to cathode 4 may be readily set.

The device has the plate characteristic of a high impedance pentode and has a voltage current characteristic such as represented by curve 20 in Figure 2 when screen grid 6 of the loading device is positive with respect to the cathode. A change of the voltage of control grid 5 serves to change the "height" or distance of the flat portion of the curve above the voltage axis so that with, say an increase in a positive direction of the potential of grid 5, a characteristic curve represented by 21 may be obtained. It has been found that as the potential of screen grid 6 is made less positive, the characteristic curve of the tube may be changed to that of curve 22, and the characteristic curve may be changed to that of a triode, shown by curve 23 when the bias on grids 5 and 6 are zero. If grid 5 is biased positively, with grid 6 at zero potential with respect to the cathode, the slope of this characteristic curve may be increased as shown by curve 24, and the triode curve such as 24 may be shifted along the voltage axis to a position indicated by curve 25 by making screen grid 6 more negative. The voltage current characteristic of the series connected phototube has for convenience been shown upon the same ordinates in Figure 2 by curve 26.

If a high degree of sensitivity is desired so that a small percentage change of light will give a full scale deflection of the indicating meter, grid 6 is biased positively with grid 5 at zero or some negative potential so as to obtain the pentode voltage current characteristic of curve 20. As thus adjusted, a small change in plate current through load impedance device 3 causes a large change in plate voltage so that a very small change of light upon the phototube may swing the control grid potential of amplifier 9 through a wide range. If the same degree of sensitivity is desired at a higher average level of the illumination, it is merely necessary to increase positively the potential of control grid 5 or to make screen grid 6 more positive to obtain a characteristic such as 21.

If now, it is desired to reduce the sensitivity of my photometer so that large percentage changes in illumination may be indicated on the milliammeter, it is merely necessary to convert the load impedance characteristics to that of a triode and, as indicated, for example, by curves 23 or 24, by reducing the screen grid potential to zero or some low value. The slope of the characteristic curve is conveniently adjusted by varying the potential upon the control grid 5 so that any desired range of illumination may be indicated upon the meter. Hence, by setting the potential of grid 6 at zero and grid 5 at some positive potential, the steep slope of characteristic curve 24 may be obtained so that comparatively wide changes of current through the phototube causes but comparatively small changes of voltage drop across the loading device and comparatively small changes of deflection of the meter needle.

Zero to maximum on the meter 12 may be made to cover light changes from zero to any desired maximum or from any finite value of light to any other finite value merely by shifting the plate voltage-plate current characteristic curve along the voltage axis. This shift in the curve as from curve 24 to curve 25 along the voltage axis may be made without materially affecting the dynamic impedance of the tube by increasing negatively the potential of grid 6, with grid 5 at zero or some positive potential with respect to the cathode. In this way, it is possible to obtain practically any desired load impedance at any desired current and any desired voltage which facilitates the adjustment of the photometer to measure any range of light upon the current meter.

In the circuits shown, a photometer is disclosed which will accurately indicate small percentage changes of light at practically any desired level of illumination, the sensitivity of which may be readily varied, and which is simple in construction, economical to manufacture, and easy to adjust. While a phototube has been shown at 1, it is obvious that any variable current device, such as a selenium cell, may be used in my photometer. My device, further, may be conveniently employed as a multi-range ohmmeter by connecting unknown resistors in place of the phototube. With the series voltage known and the resistance of the thermionic loading impedance known for predetermined grid potentials, the meter may be calibrated in ohms. As a photometer, good results have been obtained by connecting a phototube commercially known as Type 919 in series with tubes 3 and 9 of the types commercially known respectively as 954 and 38, and with batteries 19, 19' and 2, respectively, of 4.5 volts, 4.5 volts and 6 volts.

Although I have shown and described one specific embodiment of my invention, I am fully aware that many modifications thereof may be made without departing from the scope of my invention. I desire, therefore, that my invention be not restricted except insofar as necessitated by the prior art and by the spirit of the appended claims.

I claim:

1. A photometer comprising a variable current light responsive device connected in series with a source of potential and the anode-cathode path of a thermionic load impedance, a voltage indicating device connected across said impedance, and means to choose the plate voltage-plate current characteristics of said impedance.

2. In combination, a variable current light responsive device, a battery and a load impedance connected in series, said impedance comprising the anode-cathode path of a thermionic discharge device with a cathode, an anode and grid electrode, a potential source connected between said electrodes and cathode and variable to select the plate voltage-plate current response of said impedance, and a voltage indicating device connected across said impedance.

3. A photometer comprising a photocell, a battery, and a load impedance connected in series, said impedance comprising a thermionic discharge device with a cathode, an anode and grid electrodes, a potential source connected to said electrodes and variable to change the voltage-current characteristics of said impedance, and means to indicate the current flowing through said impedance comprising a voltage amplifier tube connected with its input electrodes respectively to the anode and cathode of said discharge device and a current meter connected in the anode circuit of said amplifier.

4. A photometer comprising a phototube connected in series with a source of potential and a variable load impedance, said impedance comprising an electron discharge device with a plurality of grids, and an anode connected to the cathode of the phototube, a vacuum tube voltmeter connected across said impedance and means for adjusting the relative potentials on said grids to set the zero of said meter for any desired phototube current.

5. A photometer comprising a source of potential, a phototube comprising a photocathode and an anode, and a variable load impedance comprising an electron discharge device with a thermionic cathode, a plate and a plurality of grids interposed between said plate and said cathode, said phototube and said impedance being connected in series with said source of potential, means for biasing said grids with reference to said cathode to shift the plate voltage-plate current characteristics of said device, and a voltage indicating device connected across said impedance.

6. Means for measuring current of any desired range in a circuit comprising a variable load impedance connected in said circuit, said impedance comprising an electron discharge device with a thermionic cathode, a plate, and a plurality of grids interposed between said plate and said cathode, the anode-cathode path of said impedance being connected in series in said circuit, means to change the sensitivity and range of the measuring means comprising connections for changing the bias of said grids with reference to said cathode to change the plate voltage-plate current characteristics of said device, and a voltage indicating device connected across said impedance.

FRANCIS H. SHEPARD, Jr.